(12) United States Patent
Kim et al.

(10) Patent No.: US 12,095,062 B2
(45) Date of Patent: *Sep. 17, 2024

(54) POUCH CASE, AND SECONDARY BATTERY AND SECONDARY BATTERY PACK USING THE SAME

(71) Applicant: SK On Co., Ltd., Seoul (KR)

(72) Inventors: Tae IL Kim, Daejeon (KR); Won Seok Jeong, Daejeon (KR); Sung Yeop Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,786

(22) Filed: Apr. 17, 2023

(65) Prior Publication Data
US 2023/0261276 A1   Aug. 17, 2023

Related U.S. Application Data

(63) Continuation of application No. 17/337,542, filed on Jun. 3, 2021, now Pat. No. 11,658,358, which is a (Continued)

(30) Foreign Application Priority Data
Mar. 30, 2018   (KR) .................. 10-2018-0037661

(51) Int. Cl.
*H01M 10/647* (2014.01)
*H01M 10/613* (2014.01)
(Continued)

(52) U.S. Cl.
CPC ....... *H01M 10/647* (2015.04); *H01M 10/613* (2015.04); *H01M 10/6554* (2015.04);
(Continued)

(58) Field of Classification Search
None
See application file for complete search history.

(56) References Cited

U.S. PATENT DOCUMENTS

2014/0295241 A1*   10/2014   Tao ................... H01M 10/6554
429/120

FOREIGN PATENT DOCUMENTS

KR   20070102768 A   10/2007
KR   20130014252 A   2/2013
(Continued)

OTHER PUBLICATIONS

Notice of Allowance issued by the Korean Intellectual Property Office for Application No. 10-2018-0037661 issued on Jun. 5, 2023.

*Primary Examiner* — Gregg Cantelmo
(74) *Attorney, Agent, or Firm* — IP & T GROUP LLP

(57) ABSTRACT

Provided is a pouch case including first and second accommodation portions formed to accommodate the electrode assembly, a sealing portion formed along an outer part of the pouch case to surround the first and second accommodation portions, and a connecting portion formed with the same depth as that of the first and second accommodation portion and configured to connect the first and second accommodation portions at a predetermined interval, wherein a protrusion protrudes in a direction toward the sealing portion at opposite ends of the connecting portion. Accordingly, in the pouch case, and a secondary battery and a secondary battery pack using the same, a perfect cooling structure is acquired by uniformly forming one side surface of the secondary battery, and thus, an effect of holding one side surface of the secondary battery to be close to a cooling plate to maximize cooling efficiency is achieved.

4 Claims, 8 Drawing Sheets

Related U.S. Application Data continuation of application No. 16/368,047, filed on Mar. 28, 2019, now Pat. No. 11,056,734.

(51) Int. Cl.
*H01M 10/6554* (2014.01)
*H01M 50/105* (2021.01)
*H01M 50/178* (2021.01)
*H01M 50/211* (2021.01)
*H01M 50/548* (2021.01)

(52) U.S. Cl.
CPC ....... *H01M 50/105* (2021.01); *H01M 50/178* (2021.01); *H01M 50/211* (2021.01); *H01M 50/548* (2021.01)

(56) References Cited

FOREIGN PATENT DOCUMENTS

| | | | |
|---|---|---|---|
| KR | 20160149604 A | 12/2016 | |
| KR | 20170050444 A | 5/2017 | |
| KR | 20180029856 A | 3/2018 | |
| WO | WO-2013031406 A1 * | 3/2013 | .......... H01M 10/625 |

\* cited by examiner

POUCH CASE, AND SECONDARY BATTERY AND SECONDARY BATTERY PACK USING THE SAME

CROSS-REFERENCE TO RELATED APPLICATIONS

This application is a continuation of U.S. patent application Ser. No. 17/337,542 filed on Jun. 3, 2021 and issued as U.S. Pat. No. 11,658,358 B2 on May 23, 2023. The Ser. No. 17/337,542 application is a continuation of U.S. patent application Ser. No. 16/368,047 filed on Mar. 28, 2019 and issued as U.S. Pat. No. 11,056,734 B2 on Jul. 6, 2021, which claims priority under 35 U.S.C. § 119 to Korean Patent Application No. 10-2018-0037661, filed on Mar. 30, 2018, in the Korean Intellectual Property Office. The entire disclosure of each of the foregoing applications is incorporated herein by reference in its entirety.

TECHNICAL FIELD

The following disclosure relates to a pouch case, and a secondary battery and a secondary battery pack using the same, and more particularly, to a pouch case configured in such a way that a perfect cooling structure is formed on one side surface of a secondary battery using the pouch case and one side surface of the secondary battery is held close to the cooling plate to maximize cooling efficiency and to have high energy density, and a secondary battery and a secondary battery pack using the same.

BACKGROUND

In general, a lithium secondary battery is classified into a can type secondary battery in which an electrode assembly is installed in a metallic can, and a pouch type secondary battery in which an electrode assembly is installed in a pouch of an aluminum laminate sheet, according to a shape of a case.

Lithium secondary batteries have been widely used in a medium and large size device such as a vehicle or a power storage device as well as a small size mobile device. In this case, to increase capacitance and output, a plurality of pouch type secondary batteries that are easily stacked and have a low weight are connected and used.

However, when a plurality of pouch type secondary batteries are stacked to configure a battery module, heat generated from the plurality of secondary batteries are combined to rapidly increase a temperature of a battery module, and thus, when the battery module is configured using the plurality of pouch type secondary batteries, it is very important to ensure stable and effective cooling performance.

Accordingly, as a cooling method having a simple structure while ensuring effective cooling performance, research has been conducted on a method of cooling a side surface portion of a pouch type secondary battery via direct surface contact with a cooling plate, but thus far, it is difficult to effectively hold a side surface portion of a pouch type secondary battery close to a cooling plate due to limitations of a shape of a pouch case.

FIG. 1 is an exploded perspective view of a pouch type secondary battery according to the conventional art.

Referring to FIG. 1, a pouch case 10 according to the conventional art configured to provide an accommodation space for accommodating an electrode assembly 20 therein includes a pair of accommodation portions that are formed as independent spaces, and each of the pair of accommodation portions has a width and a length, which correspond to the width and the length of the accommodated electrode assembly 20, respectively, and the sum of the depths of the pair of accommodation portions approximately corresponds to the thickness of the electrode assembly 20.

However, the pouch type secondary battery according to the conventional art has one side surface portion except for three side surfaces that seal the pouch case 10, on which a concave line is formed in a length direction of a side surface. As such, due to the concave line formed on the side surface portion of the secondary battery, there is a problem in that it is difficult to effectively bring the side surface portion of the secondary battery into contact with the cooling plate and cooling efficiency is degraded.

To overcome the above problem, Patent Document 1 discloses that a pair of accommodation portions is formed as one space in a pouch case rather than being separated as independent spaces. However, even if the pouch case with such shape is used, when an electrode assembly is packaged, it is not easy to fold the case and it is difficult to uniformly form a side surface portion of a secondary battery, which contacts a cooling plate.

CITED REFERENCE

Patent Document

Patent Document 1: Korean Patent Laid-Open Publication No. 10-2007-0102768

SUMMARY

An embodiment of the present disclosure is directed to providing a pouch case configured in such a way that a cooling structure is formed on one side surface of a secondary battery using the pouch case and one side surface of the secondary battery is held close to a cooling plate to maximize cooling efficiency and to have high energy density, and a secondary battery and a secondary battery pack using the same.

Another embodiment of the present disclosure is directed to providing a pouch case configured in such a way that a side surface portion of a secondary battery is formed to be flat rather than to protrude, and thus, a relatively small space is occupied with respect to the same battery capacitance to have high energy density, and a secondary battery and a secondary battery pack using the same.

The present disclosure is not limited to the above objects, and additional objects of the present disclosure will be set forth in part in the description which follows and in part will become apparent to those having ordinary skill in the art upon examination of the following or may be learned from practice of the present disclosure.

In one general aspect, a pouch case for accommodating and packaging an electrode assembly including a plurality of electrodes that are stacked with a separator interposed therebetween includes: first and second accommodation portions formed to accommodate the electrode assembly; a sealing portion formed along an outer part of the pouch case to surround the first and second accommodation portions; and a connecting portion formed with the same depth as that of the first and second accommodation portions and configured to connect the first and second accommodation portions at a predetermined interval, wherein a protrusion protrudes in a direction toward the sealing portion at opposite ends of the connecting portion.

In the pouch case according to the present disclosure, the protrusion may include a top portion formed with a predetermined height on a bottom surface of the connecting portion; and an inclination portion formed to be inclined toward a bottom surface of the connecting portion at one end of the top portion.

In the pouch case according to the present disclosure, the inclination portion may be connected to the top portion and the bottom surface of the connecting portion with a predetermined radius of curvature.

In the pouch case according to the present disclosure, the top portion may be formed with the same height as that of the sealing portion.

In the pouch case according to the present disclosure, the first accommodation portion and one side of the connecting portion may be connected to each other along a first bent line, the second accommodation portion and the other side of the connecting portion may be connected to each other along a second bent line, and the pouch case may be bent along the first and second bent lines to accommodate the electrode assembly.

In the pouch case according to the present disclosure, the first and second bent lines may be spaced apart from each other by a distance corresponding to a thickness of the electrode assembly.

In another general aspect, a secondary battery includes: the pouch case as described above; and the electrode assembly including the plurality of electrodes that are stacked with the separator interposed therebetween, wherein the pouch case accommodates and packages electrode assembly in an accommodation space formed by folding the sealing portions to allow the first and second accommodation portions to face each other.

In the secondary battery according to the present disclosure, the connecting portion may be configured to uniformly form a side surface of the packaged secondary battery, and the sealing portion may include an extension portion protruding by a predetermined length in a perpendicular direction to a side surface of the secondary battery at a portion adjacent to opposite end portions of the side surface of the secondary battery.

In another general aspect, a secondary battery pack includes: one or more of the secondary batteries as described above; and a cooling plate including a first side surface, a second side surface facing the first side surface, and an upper surface, which surface-contacts the side surface portion of the one or more secondary batteries.

In the secondary battery pack according to the present disclosure, the connecting portion may be configured to uniformly form a side surface of the packaged secondary battery, and the sealing portion may include an extension portion protruding by a predetermined length in a perpendicular direction to a side surface of the secondary battery at a portion adjacent to opposite end portions of the side surface of the secondary battery.

In the secondary battery pack according to the present disclosure, a width between the first and second side surfaces of the cooling plate may correspond to a length of the connecting portion of the secondary battery.

In the secondary battery pack according to the present disclosure, a width between the first and second side surfaces of the cooling plate may be larger than a length of the connecting portion of the secondary battery.

In the secondary battery pack according to the present disclosure, a step difference may be formed with a height equal to or larger than the predetermined length of the extension portion of the secondary battery on each of the first and second side surfaces of the cooling plate.

In the secondary battery pack according to the present disclosure, one or more grooves may be formed with a depth equal to or larger than the predetermined length of the extension portion to accommodate the extension portion of the secondary battery on each of the first and second side surfaces of the cooling plate.

DETAILED DESCRIPTION OF EMBODIMENTS

Hereinafter, exemplary embodiments will be described in detail with reference to the accompanying drawings. The following detailed description is merely exemplary and is intended to explain exemplary embodiments of the present disclosure.

Figure 1:
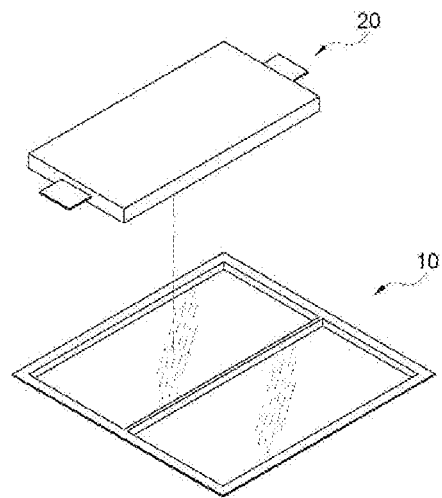
FIG. 1 is an exploded perspective view of a secondary battery according to the conventional art.
Figure 2:
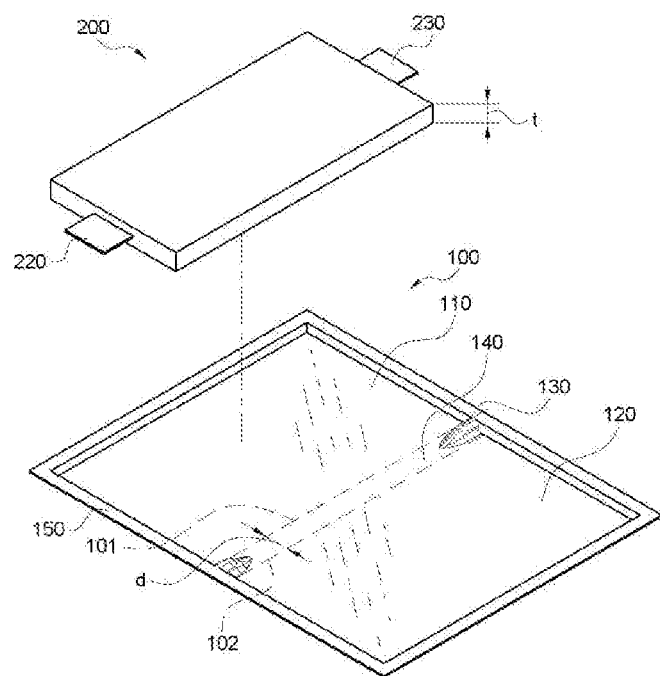
FIG. 2 is an exploded perspective view of a secondary battery according to the present disclosure.

FIG. 2 is an exploded perspective view of a secondary battery 300 according to the present disclosure.

Referring to FIG. 2, the secondary battery 300 according to the present disclosure may include a pouch case 100 and an electrode assembly 200 including a plurality of electrodes that are stacked with a separator interposed therebetween. Here, the pouch case 100 may accommodate and surround the electrode assembly 200 and may be packed via sealing of sealing portions 150 that contact each other.

First and second electrode tabs 220 and 230 may be formed at opposite ends of the electrode assembly 200, and although FIG. 2 illustrates the case in which electrode tabs are formed on opposite side surfaces of the electrode assembly 200, the configuration of the electrode tab of the secondary battery 300 according to the present disclosure is not limited thereto, and it may be possible to simultaneously dispose the first and second electrode tabs 220 and 230 on any one of side surfaces of the sealing portions 150.

Referring to FIG. 2, the pouch case 100 according to the present disclosure may include first and second accommodation portions 110 and 120 that are formed to accommodate the electrode assembly 200, the sealing portions 150 that are formed along an outer part of the pouch case 100 to surround the first and second accommodation portions 110 and 120, and a connecting portion 140 that is formed with the same depth as that of the first and second accommodation portions 110 and 120 and is configured to connect the first and second accommodation portions 110 and 120 at a predetermined interval 'd', and protrusions 130 that protrude in a direction toward sealing portions 150 may be formed at opposite ends of the connecting portion 140.

One pair of first and second accommodation portions 110 and 120 for accommodating the electrode assembly 200 may be formed in the pouch case 100. The first and second accommodation portions 110 and 120 may be formed with a recessed shape in the pouch case 100 using a method of pressing an internal portion of the pouch case 100, etc. Here, each of the first and second accommodation portions 110 and 120 may have a size corresponding to the width and length of the electrode assembly 200, and the sum of the lengths of the first and second accommodation portions 110 and 120 may be formed to correspond to a thickness 't' of the electrode assembly 200.

The connecting portion 140 may be a component that is formed with the same depth as that of the first and second accommodation portions 110 and 120 and connects the first and second accommodation portions 110 and 120 to be spaced apart from each other at the predetermined interval 'd', and may connect the first and second accommodation portions 110 and 120 as if bottoms surfaces of the first and second accommodation portions 110 and 120 extend. Here, the first accommodation portion may be connected to one side of the connecting portion 140 along a first bent line, and the second accommodation portion may be connected to the other side of the connecting portion 140 along a second bent line. When the secondary battery 300 is configured using the pouch case 100 according to the present disclosure, the pouch case 100 may be bent along the first and second bent lines 101 and 102 and may accommodate the electrode assembly 200.

Accordingly, the connecting portion 140 may configure a side surface portion 310 of the secondary battery 300 after the secondary battery 300 is assembled, and thus, the width of the connecting portion 140 may be determined to space the first and second bent lines 101 and 102 apart from each other at the predetermined interval 'd' by as much as a distance corresponding to the thickness 't' of the electrode assembly 200. The width of the connecting portion 140 may be the same as the predetermined interval 'd at which the first and second bent lines 101 and 102 are spaced apart from each other, and as described above, the predetermined interval 'd' may be set to be substantially the same as the thickness 't' of the electrode assembly 200, but the width of the connecting portion 140 is not limited thereto, and as necessary, the width of the connecting portion 140 may be smaller or larger than the thickness of the electrode assembly 200.

The protrusions 130 that protrude in a direction toward the sealing portions 150 may be formed at opposite ends of the connecting portion 140.

The protrusions 130 may be a component for easily folding the sealing portions 150 without distortion of opposite ends of the side surface portion 310 of the secondary battery 300 when the sealing portions 150 are folded to allow the first and second accommodation portions 110 and 120 to face each other in order to form the accommodation space for accommodating the electrode assembly 200 by the pouch case 100, and may include a top portion 131 formed with a predetermined height on a bottom surface of the connecting portion 140, and an inclination portion 132 that is formed to be inclined toward the bottom surface of the connecting portion 140 at one end of the top portion 131.

Figure 3:
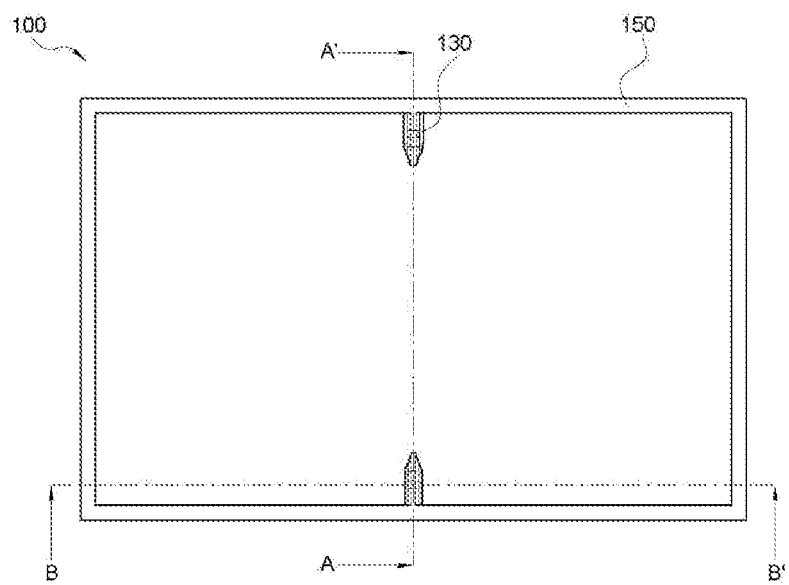
FIG. 3 is a plan view of a pouch case according to the present disclosure.
Figure 4:
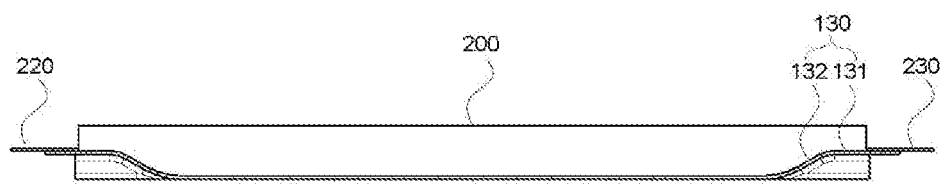
FIG. 4 is a cross-sectional view taken along line A-A' of FIG. 3.
Figure 5:
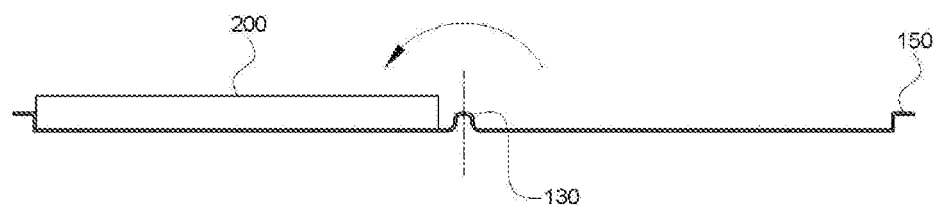
FIG. 5 is a cross-sectional view taken along line B-B' of FIG. 3.

A detailed shape of the protrusions 130 will be understood with reference to FIGS. 3 to 5.

FIG. 3 is a plan view of the pouch case 100 according to the present disclosure. FIG. 4 is a cross-sectional view taken along line A-A' of FIG. 3. FIG. 5 is a cross-sectional view taken along line B-B' of FIG. 3.

Referring to FIG. 4, the protrusions 130 may include the top portion 131 that extends with the same height as that of the sealing portions 150, and the inclination portion 132 that is formed to be inclined toward the bottom surface of the connecting portion 140 at one end of the top portion 131. As shown in FIG. 4, the inclination portion 132 may be gradually connected to the top portion 131 and the bottom surface of the connecting portion 140 with a predetermined radius of curvature while being connected to the top portion 131 and the bottom surface of the connecting portion 140. As such, the protrusions 130 may be formed to be gradually connected to the sealing portions 150 and the connecting portion 140 without discontinuous inclination, and thus, when the pouch case 100 is folded, an effect of preventing the protrusions 130 positioned on the side surface portion 310 of the secondary battery 300 from being damaged or torn may be achieved.

Referring to FIG. 5, the protrusions 130 may be formed on the connecting portion 140 that connects the first and second accommodation portions 110 and 120 to be spaced apart from each other, and the width of the protrusions 130 may be formed to be smaller than the predetermined interval 'd' at which the first and second accommodation portions 110 and 120 are spaced apart from each other.

Thus far, although the example in which the top portions 131 of the protrusions 130 extend with the same height as that of the sealing portions 150 and the width of the protrusions 130 is formed to be smaller than the predetermined interval 'd' has been described, the height of the top portions 131 and the width of the protrusions 130 are not limited thereto, and it may be possible to adjust the height, the width, or the like of the protrusions 130 according to the thickness 't' and the shape of the electrode assembly 200 or a material of the pouch case 100.

Figure 6:
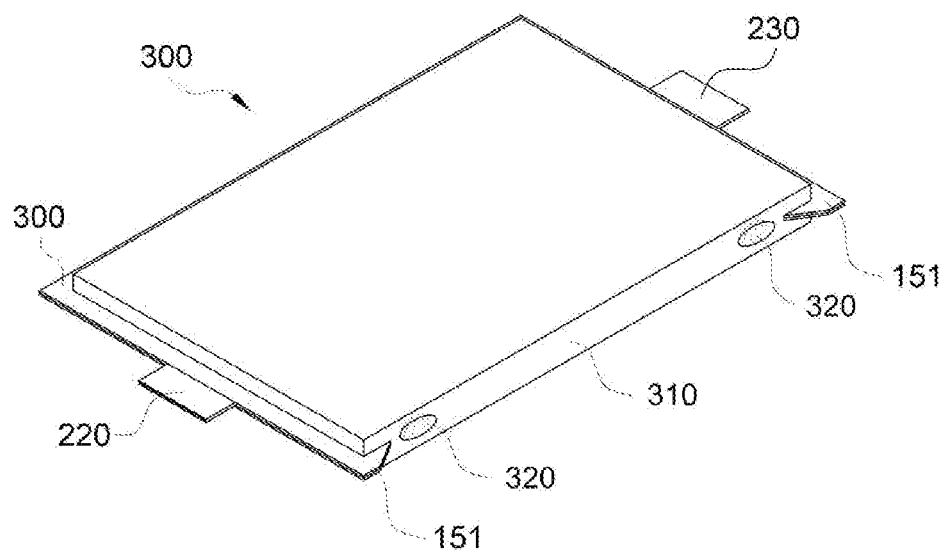
FIG. 6 is a perspective view of a secondary battery according to the present disclosure.

FIG. 6 is a perspective view of the secondary battery 300 according to the present disclosure.

The secondary battery 300 using the pouch case 100 according to the present disclosure may include the pouch case 100 according to the present disclosure and the electrode assembly 200, and the pouch case 100 may be sealed along the sealing portions 150 after the electrode assembly 200 is accommodated in the accommodation space formed by folding the sealing portions 150 to allow the first and second accommodation portions 110 and 120 to face each other.

Referring to FIG. 6, the connecting portion 140 of the pouch case 100 may be configured to uniformly form the side surface portion 310 of the secondary battery 300, and dimples 320 that are recessed toward an internal part of the secondary battery 300 at a position corresponding to the protrusions 130 may be formed at opposite ends of the side surface portion 310 of the secondary battery 300.

The dimples 320 may guide the sealing portions 150 at opposite ends of the side surface portion 310 to be easily folded when the pouch case 100 is folded, and may have various sizes and shapes according to the height, the weight, or the like of the protrusions 130, which is appropriately adjusted according to the thickness 't' and the shape of the electrode assembly 200 or a material of the pouch case 100.

As shown in FIG. 6, the secondary battery 300 using the pouch case 100 according to the present disclosure may be configured in such a way that the side surface portion 310 is not entirely concavely recessed or does not protrude, but instead, is formed with a flat and uniform shape.

Accordingly, the secondary battery 300 according to the present disclosure may have high heat dissipation efficiency due to low heat resistance because the side surface portion 310 is fully close to a cooling plate 500 when the side surface portion 310 contacts the cooling plate 500 to cool the secondary battery 300.

The secondary battery 300 using the pouch case 100 according to the present disclosure may be configured in such a way that the side surface portion 310 is not entirely concavely recessed or does not protrude, but instead, is formed with a flat shape, and thus, the secondary battery 300 according to the present disclosure may have high heat dissipation efficiency due to low heat resistance because the side surface portion 310 is fully close to the cooling plate 500 when the side surface portion 310 contacts the cooling plate 500 to cool the secondary battery 300.

In addition, the secondary battery 300 according to the present disclosure may be configured in such a way that the side surface portion 310 is uniformly formed rather than to protrude, and thus, the side surface portion 310 may occupy a smaller space with respect to the same battery capacitance than the case in which the side surface portion 310 is folded outward or protrudes due to a separate sealing member, and accordingly, the secondary battery 300 according to the present disclosure may advantageously have high energy density.

The sealing portions 150 that are positioned at portions adjacent to opposite end portions of the side surface portion 310 of the secondary battery 300 may include an extension portion 151 that protrudes by a predetermined length in a perpendicular direction to the side surface portion 310 of the secondary battery 300 during a procedure of folding the sealing portions 150 for packaging. Accordingly, a space may be formed between the extension portion 151 and the side surface portion 310 by as much as a length in which the extension portion 151 extends. Here, the length of the extension portion 151 may be several mm.

The extension portion 151 formed as described above may perform a function of maintaining or fixing arrangement of the secondary battery 300 with respect to the cooling plate 500 by forming a groove 520 or a step difference 510 for accommodating the extension portion 151 on a side surface of the cooling plate 500 when the secondary battery 300 according to the present disclosure and the cooling plate 500 are coupled to manufacture a secondary battery pack.

FIGS. 7 to 12 are diagrams showing first to third examples in which the secondary battery 300 and the cooling plate 500 are coupled to manufacture a secondary battery pack according to the present disclosure.

Figure 7:
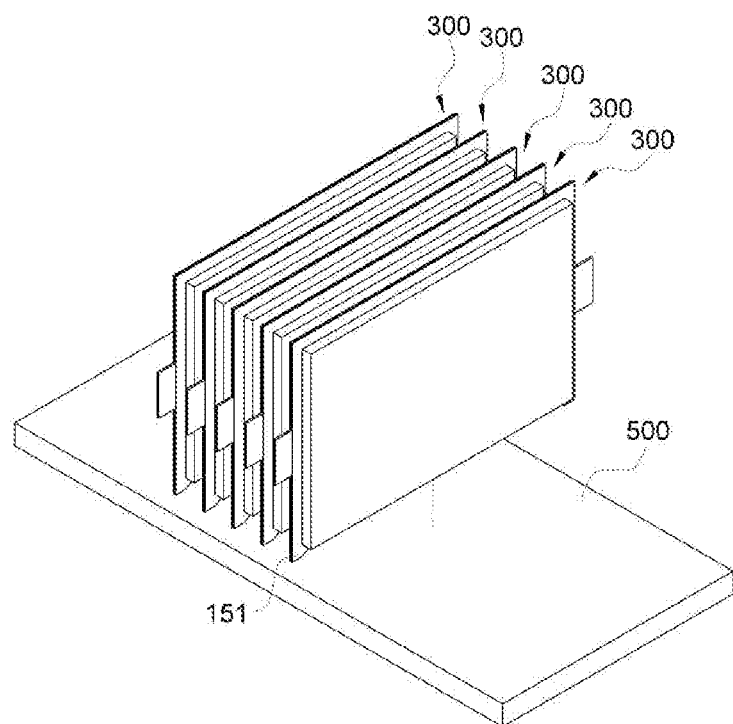
FIG. 7 is a diagram showing a first example in which a secondary battery and a cooling plate are coupled to configure a secondary battery pack according to the present disclosure.
Figure 8A:
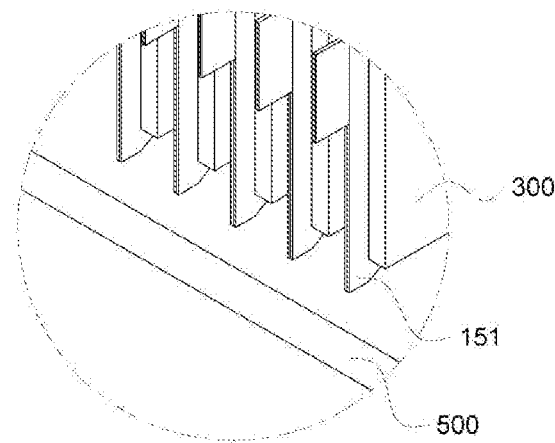
FIGS. 8A and 8B are detailed enlarged views of FIG. 7.
Figure 8B:
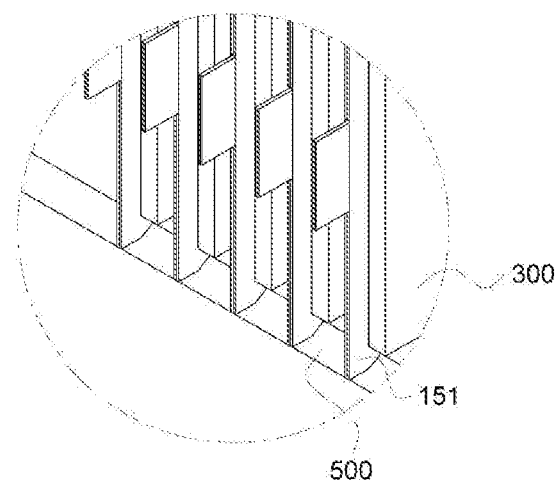

FIGS. 7, 8A, and 8B are diagrams showing the first example of the secondary battery pack according to the present disclosure, and a detailed enlarged view thereof.

Referring to FIG. 7, the secondary battery 300 according to the present disclosure may be disposed in a plural number on the cooling plate 500 and may configure the secondary battery pack. Here, the cooling plate 500 may include a first side surface, a second side surface facing the first side surface, and one or more upper surfaces, which surface-contact the side surface portion 310 of the secondary battery 300.

In the first example of the secondary battery pack shown in FIG. 7, a width between the first and second side surfaces of the cooling plate 500 may correspond to the length of the connecting portion 140 of the secondary battery 300. Referring to FIGS. 8A and 8B, in this case, the cooling plate 500 may be configured to be inserted between the extension portions 151 of the secondary battery 300 when the upper surface of the cooling plate 500 is held close to the side surface portion 310 of the secondary battery 300.

Due to this structure, movement of the secondary battery 300 in a length direction of the secondary battery 300 may be limited, and thus, a position of the secondary battery 300 may be prevented from being separated from the cooling plate 500 and an effect of maintaining arrangement between the secondary battery 300 and the cooling plate 500 may be achieved.

Figure 9:
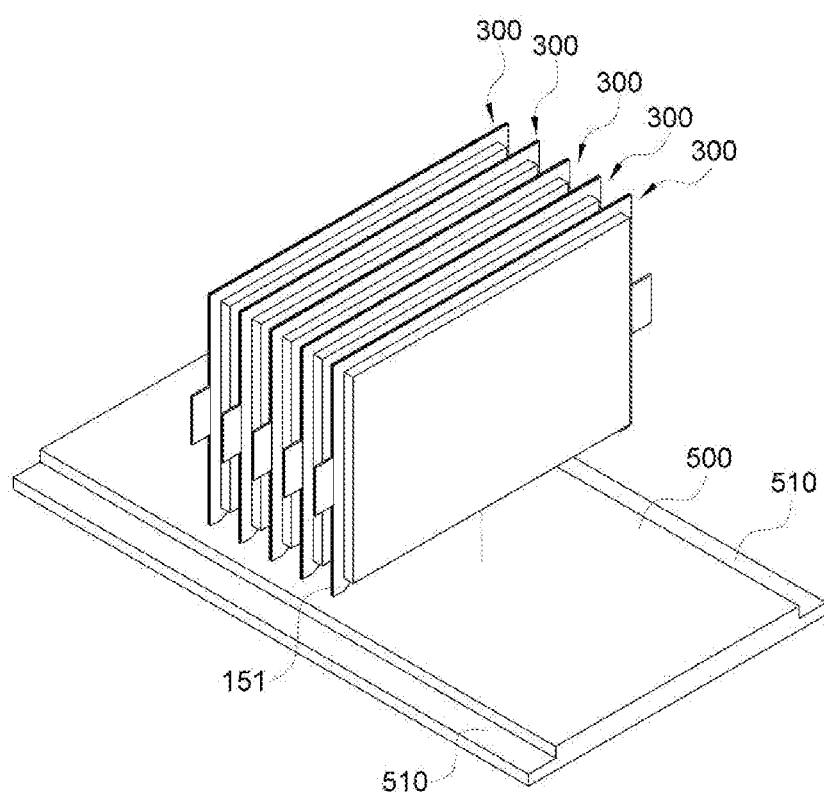
FIG. 9 is a diagram showing a second example in which a secondary battery and a cooling plate are coupled to configure a secondary battery pack according to the present disclosure.

FIGS. 9 and 10 are a diagram showing the second example of the secondary battery pack according to the present disclosure, and a detailed enlarged view thereof, respectively.

Figure 10A:
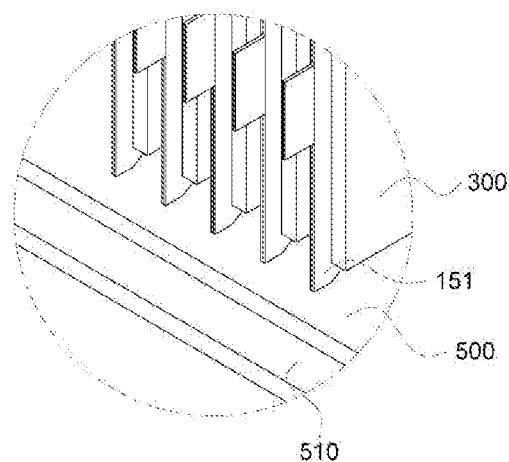
FIGS. 10A and 10B are detailed enlarged views of FIG. 9.
Figure 10B:
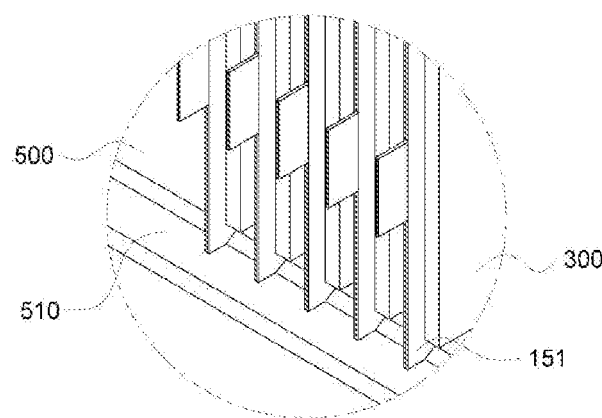

According to the second example of the secondary battery pack shown in FIG. 9, a width between the first and second side surfaces of the cooling plate 500 may be formed to be larger than the length of the connecting portion 140 of the secondary battery 300, and the step difference 510 may be formed with a height equal to or larger than a predetermined length by which the extension portion 151 of the secondary battery 300 protrudes on each of the first and second side surfaces of the cooling plate 500. Referring to FIGS. 10A and 10B, the extension portion 151 of the secondary battery 300 may be formed to be put on the step difference formed on the cooling plate 500 when the upper surface of the cooling plate 500 is held close to the side surface portion 310 of the secondary battery 300.

Due to this structure, movement of the secondary battery 300 in a length direction of the secondary battery 300 may be limited, and thus, a position of the secondary battery 300 may be prevented from being separated from the cooling plate 500 and an effect of maintaining arrangement between the secondary battery 300 and the cooling plate 500 may be achieved. In addition, in the secondary battery pack according to the second example, the width of the cooling plate 500 may further extend compared with that of the cooling plate 500 according to the first example, and thus, an effect of further enhancing cooling efficiency may be achieved.

Figure 11:
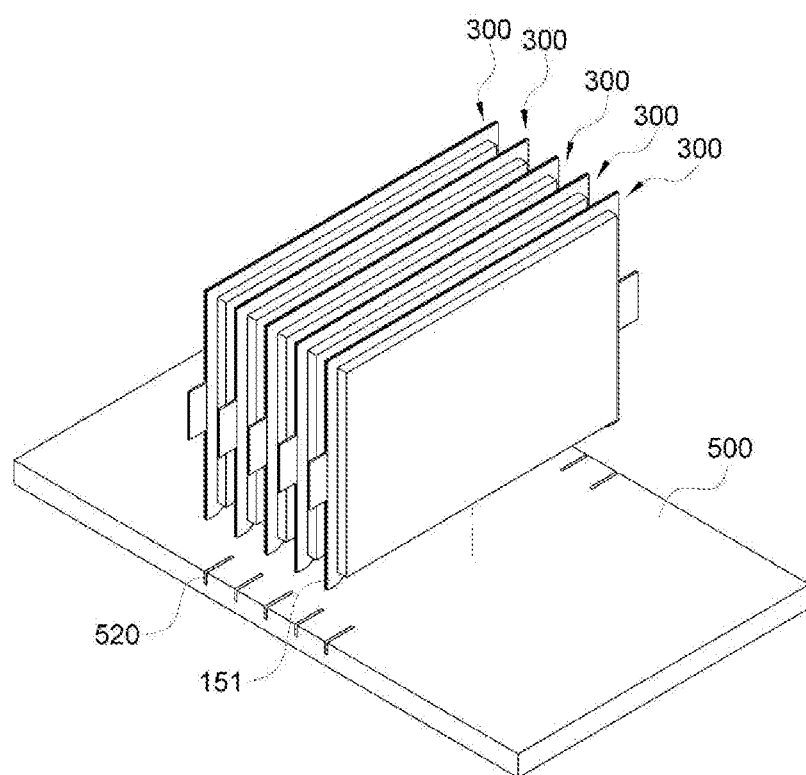
FIG. 11 is a diagram showing a third example in which a secondary battery and a cooling plate are coupled to configure a secondary battery pack according to the present disclosure.

FIGS. 11 and 12 are a diagram showing the third example of the secondary battery pack according to the present disclosure, and a detailed enlarged view thereof, respectively.

Figure 12A:
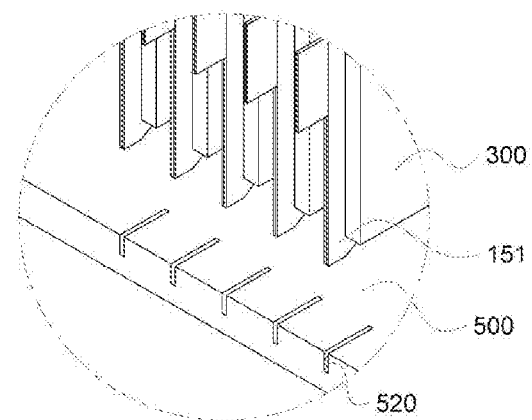
FIGS. 12A and 12B are detailed enlarged views of FIG. 11.
Figure 12B:
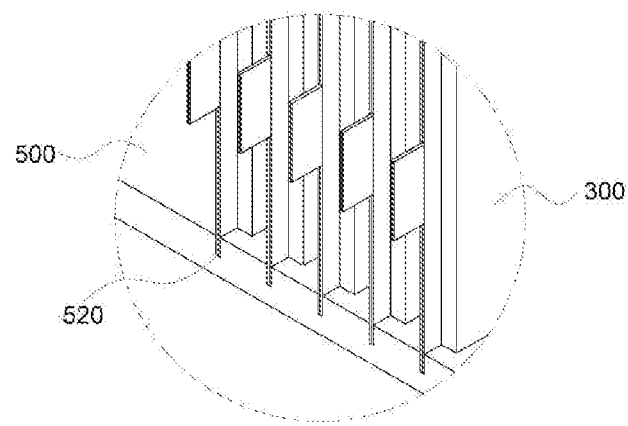

According to the third example of the secondary battery pack shown in FIG. 11, a width between the first and second side surfaces of the cooling plate 500 may be formed to be larger than the length of the connecting portion 140 of the secondary battery 300, and one or more grooves 520 may be formed with a depth equal to or larger than a predetermined length of the extension portion 151 on each of the first and second side surfaces of the cooling plate 500, in order to accommodate the extension portion 151 of the secondary battery 300. Referring to FIGS. 12A and 12B, the extension portion 151 of the secondary battery 300 may be formed to be accommodated in the groove 520 formed on the cooling plate 500 when the upper surface of the cooling plate 500 is held close to the side surface portion 310 of the secondary battery 300.

Due to this structure, movement of the secondary battery 300 both in a length direction of the secondary battery 300 and a perpendicular direction thereto may be limited, and thus, a position of the secondary battery 300 may be prevented from being separated from the cooling plate 500 and an effect of maintaining arrangement between the secondary battery 300 and the cooling plate 500 may be achieved. In addition, in the secondary battery pack according to the third example, the width of the cooling plate 500 may further extend compared with that of the cooling plate 500 according to the first example, and thus, an effect of further enhancing cooling efficiency may be achieved.

Overall, referring to FIGS. 7 to 12, in the secondary battery pack according to the present disclosure, each of the plurality of secondary batteries 300 disposed on the cooling plate 500 may be disposed to hold the side surface portion 310 to be close to the cooling plate 500 to dissipate heat of the secondary battery 300, and movement of the secondary battery 300 may be limited in a length direction of the secondary battery 300 with respect to the cooling plate 500, and thus, due to the extension portion 151 that protrudes by a predetermined length with respect to the side surface portion 310 of the secondary battery 300, a position of the secondary battery 300 may be prevented from being separated from the cooling plate 500 and an effect of maintaining arrangement between the secondary battery 300 and the cooling plate 500 may be achieved.

According to the present disclosure, in the pouch case, and the secondary battery and the secondary battery pack using the same, a perfect cooling structure may be acquired by uniformly forming one side surface of a secondary battery, and thus, an effect of holding one side surface of the secondary battery to be close to a cooling plate to maximize cooling efficiency may be achieved.

According to the present disclosure, in the pouch case, and the secondary battery and the secondary battery pack using the same, a side surface portion of the secondary battery may be formed to be flat rather than to protrude, and thus, a relatively small space may be occupied with respect to the same battery capacitance, thereby achieving an effect of having high energy density.

Thus far, the present disclosure has been described based on exemplary embodiments for exemplifying the principle of the present disclosure, the present disclosure is not limited to the configuration and operation shown in the drawings and described in the specification. Those skilled in the art will appreciate that the present disclosure may be carried out in other specific ways than those set forth herein without departing from the spirit and essential characteristics of the present disclosure. Accordingly, the above-mentioned exemplary embodiments are exemplary in any aspect and are not limited. The scope of the present disclosure is determined by the appended claims, and all changes or modifications derived from the meaning and scope of the claims and the equivalents thereof should be interpreted to be within the scope of the present disclosure.

What is claimed is:

1. A secondary battery pack comprising:
a plurality of secondary batteries; and
a cooling plate including a first side surface, a second side surface facing the first side surface, and an upper surface, which surface contacts side surfaces of the plurality of secondary batteries;
wherein a sealing portion of each of the secondary batteries includes extension portions protruding by a predetermined length in a perpendicular direction to the side surface of each of the secondary batteries at respective portions adjacent to opposite end portions of the side surface of each of the secondary batteries,
wherein a step difference is formed with a height equal to or larger than the predetermined length of the extension portion of each of the secondary batteries on each of the first and second side surfaces of the cooling plate,
wherein dimples that are recessed toward an internal part of each of the secondary batteries are formed at opposite ends of the side surface of each of the secondary batteries.

2. The secondary battery pack of claim 1, wherein a width between the first and second side surfaces of the cooling plate is larger than a length of a connecting portion of each of the secondary batteries.

3. The secondary battery pack of claim 1, wherein the extension portion of each of the secondary batteries is formed to be put on the step difference formed on the cooling plate.

4. The secondary battery pack of claim 1, wherein the side surface of each of the secondary batteries is formed with a flat shape.

* * * * *